(12) United States Patent
Ochiai (10) Patent No.: US 7,673,897 B2
(45) Date of Patent: Mar. 9, 2010

(54) HEAD-PROTECTING AIRBAG APPARATUS

(75) Inventor: Yasuo Ochiai, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 90 days.

(21) Appl. No.: 11/299,768

(22) Filed: Dec. 13, 2005

(65) Prior Publication Data

US 2006/0131849 A1    Jun. 22, 2006

(30) Foreign Application Priority Data

Dec. 21, 2004    (JP)    ............................. 2004-369189

(51) Int. Cl.
*B60R 21/021* (2006.01)
(52) U.S. Cl. .................. 280/730.2; 280/728.2
(58) Field of Classification Search .............. 280/730.2, 280/728.2
See application file for complete search history.

(56) References Cited

U.S. PATENT DOCUMENTS

| | | | | |
|---|---|---|---|---|
| 5,529,334 | A * | 6/1996 | Meduvsky et al. | 280/738 |
| 6,102,434 | A * | 8/2000 | Ohlert et al. | 280/728.2 |
| 6,106,005 | A * | 8/2000 | Heinz et al. | 280/730.2 |
| 6,305,707 | B1 * | 10/2001 | Ishiyama et al. | 280/728.2 |
| 6,334,626 | B2 * | 1/2002 | Nakajima et al. | 280/730.2 |
| 6,485,048 | B2 * | 11/2002 | Tajima et al. | 280/728.2 |
| 6,530,594 | B1 * | 3/2003 | Nakajima et al. | 280/730.2 |
| 6,966,579 | B2 * | 11/2005 | Schneider et al. | 280/743.2 |
| 6,974,151 | B2 * | 12/2005 | Ochiai et al. | 280/728.2 |
| 7,114,744 | B2 * | 10/2006 | Sunabashiri | 280/730.2 |

(Continued)

FOREIGN PATENT DOCUMENTS

EP    1 484 222 A1    12/2004

(Continued)

OTHER PUBLICATIONS

Office Communication from European Patent Office issued on Apr. 11, 2006 for the corresponding European patent application No. 05026723.6-2421.

(Continued)

*Primary Examiner*—Paul N. Dickson
*Assistant Examiner*—Timothy Wilhelm
(74) *Attorney, Agent, or Firm*—Posz Law Group, PLC (57) ABSTRACT

The head-protecting airbag apparatus of the present invention includes an airbag and a guide bracket. The guide bracket includes two guide walls and a joint wall, thereby has a generally U-shaped cross section, and accommodates the folded airbag between the two guide walls. The guide bracket is located above a pillar portion while being covered by an airbag cover, and serves to guide the inflating airbag toward vehicle's inner side and prevent the airbag from entering vehicle's outer side of the pillar garnish. The dimension of a clearance between the two guide walls is set such that: a gap arises between the housed airbag and at least one of the guide walls, thereby the airbag is allowed to inflate in the gap in the initial stage of airbag inflation; and that the deployment direction of the airbag is controlled by the guide walls, toward vehicle's inner side. In the head-protecting airbag apparatus of the present invention, the airbag housed in the upper periphery of windows smoothly protrudes inward of vehicle without providing any gas-leakage preventing means such as a reinforcing patch.

9 Claims, 10 Drawing Sheets

U.S. PATENT DOCUMENTS

| | | | |
|---|---|---|---|
| 7,163,232 B2 * | 1/2007 | Yokoyama et al. | 280/730.2 |
| 7,175,196 B2 * | 2/2007 | Boxey | 280/730.2 |
| 2001/0040360 A1 * | 11/2001 | Ishiyama et al. | 280/728.2 |
| 2002/0074779 A1 * | 6/2002 | Masuda et al. | 280/730.2 |
| 2003/0047920 A1 | 3/2003 | Tanase et al. | |
| 2004/0075257 A1 | 4/2004 | Ogawa et al. | |
| 2004/0227334 A1 * | 11/2004 | Chausset | 280/730.2 |
| 2005/0046154 A1 * | 3/2005 | Rhea et al. | 280/728.2 |
| 2005/0110256 A1 * | 5/2005 | Crookston et al. | 280/743.1 |
| 2005/0121887 A1 * | 6/2005 | Inoue et al. | 280/730.2 |
| 2005/0173902 A1 * | 8/2005 | Boxey | 280/730.2 |
| 2005/0242551 A1 * | 11/2005 | Noguchi et al. | 280/730.2 |
| 2006/0043703 A1 * | 3/2006 | Enriquez | 280/730.2 |
| 2006/0043708 A1 * | 3/2006 | Inazu et al. | 280/730.2 |
| 2007/0126221 A1 * | 6/2007 | Yoshida | 280/743.1 |
| 2007/0132217 A1 * | 6/2007 | Seong | 280/730.2 |

FOREIGN PATENT DOCUMENTS

| | | |
|---|---|---|
| JP | A-11-091490 | 4/1999 |
| JP | A-2002-067860 | 3/2002 |
| JP | A-2004-114829 | 4/2004 |

OTHER PUBLICATIONS

Office Action dated May 26, 2009 from the Japan Patent Office in the corresponding JP application No. 2004-369189.

* cited by examiner

HEAD-PROTECTING AIRBAG APPARATUS

The present application claims priority from Japanese Patent Application No. 2004-369189 of Ochiai, filed on Dec. 21, 2004, the disclosure of which is hereby incorporated into the present application by reference.

BACKGROUND OF THE INVENTION

1. Field of the Invention

The present invention relates to a head-protecting airbag apparatus provided with an airbag, which, when fed with inflation gas, is deployable downward from upper edge of side windows of a vehicle to protect occupants' head.

2. Description of Related Art

Conventionally, a head-protecting airbag apparatus is provided with an airbag folded and housed in the upper periphery of windows inclusive of upper part of pillar portions. The housed airbag is covered by an airbag cover, and when fed with inflation gas, inflates to push and open the airbag cover, and deploys downward from the upper periphery of windows. The inflated airbag covers the vehicle's interior side of pillars and windows.

In the prior art, Japanese Patent Laid-Open No. 11-091490 is illustrative of a head-protecting airbag apparatus provided with a jump stand that prevents a deploying airbag from entering the vehicle's outer side of pillar garnish covering the inner side of a pillar portion, such that the airbag smoothly deploys toward inward of vehicle. This jump stand is disposed above, and in vehicle's outer side of, a pillar garnish, and includes a slanted guide face, in the top surface thereof. The jump stand serves to guide an inflating airbag inward of vehicle over the upper end of the pillar garnish, by having the airbag slide on its guide face.

Japanese Patent Laid-Open No. 2002-067860 is illustrative of a head-protecting airbag apparatus provided with a guide bracket. The guide bracket has a U-shaped cross section. The guide bracket includes two guide walls confronting each other, and a joint wall joining the two guide walls at the outer ends of the guide walls, and serves to guide the inflating airbag to predetermined direction inside the vehicle.

This guide bracket accommodates the folded airbag between the two guide walls, and upon airbag deployment, allows the airbag to protrude from an opening provided between the leading ends of the guide walls while controlling the deployment direction of the airbag by the two guide walls. In other words, since the bracket guides the airbag with two guide walls extending from the joint wall, the guide bracket secures more stable airbag protrusion in a predetermined direction in comparison with the jump stand. As a result, upon airbag deployment, the guide bracket prevents the airbag from bumping against or hitching on the pillar garnish, and prevents the airbag from bumping against an airbag cover located above the pillar garnish as well.

However, in the conventional guide bracket, the dimension of a clearance between the two guide walls was so set as to accommodate the folded airbag with no gaps. With this construction, if an output of the inflator for supplying inflation gas to the airbag is great, the airbag inflates rapidly in between the confronting guide walls, which can cause gas leakage. That is, the airbag must be provided with certain gas-leakage preventing means such as reinforcing patch, in a region of the guide bracket and therearound. This has increased manufacturing processes and volume of the airbag.

SUMMARY OF THE INVENTION

The present invention contemplates to solve the above-mentioned problem, and therefore, has an object to provide a head-protecting airbag apparatus which deploys an airbag housed in the upper periphery of windows inward of vehicle smoothly without providing any gas-leakage preventing means, such as reinforcing patch, in a region of the airbag where the guide bracket is located and its vicinity.

The head-protecting airbag apparatus according to the present invention is mounted in the upper periphery of windows inclusive of upper part of a pillar inside the vehicle. The pillar is covered by pillar garnish at vehicle's inner side. The airbag apparatus includes an airbag, an airbag cover and a guide bracket. The airbag is folded and housed in the upper periphery of windows inclusive of upper part of the pillar, and deploys downward therefrom to cover the inner side of the pillar and windows when fed with inflation gas. The airbag cover covers the folded and housed airbag, and is pushed and opened by the airbag upon airbag inflation. The guide bracket is located above the pillar while being covered by the airbag cover.

The guide bracket serves to guide the inflating airbag toward vehicle's inner side while preventing the airbag from entering vehicle's outer side of the pillar garnish. The guide bracket includes two guide walls extending inward of vehicle while confronting each other generally in the vertical direction, and a joint wall joining the two guide walls at the outer ends of the guide walls, thereby has a generally U-shaped cross section. The guide bracket accommodates the folded airbag between the two guide walls, and allows the airbag to protrude inward of vehicle from an opening provided between vehicle's inner side ends of the two guide walls.

The dimension of a clearance between the two guide walls is set so as to leave a gap between the housed airbag and at least one of the guide walls, such that the airbag is allowed to inflate in the gap in the initial stage of airbag inflation. The dimension of the clearance is also set such that the deployment direction of the airbag is controlled by the guide walls, toward vehicle's inner side.

In the head-protecting airbag apparatus according to the present invention, when the airbag is fed with inflation gas, the airbag pushes and opens the airbag cover and deploys downward from the upper periphery of windows, to cover the inner side of windows. Above the pillar, the airbag protrudes inward of vehicle from the opening provided between the two guide walls of the guide bracket.

At this time, the dimension of the clearance between the two guide walls is so set as to allow the airbag to inflate therein in the initial stage of inflation. In other words, the dimension is set such that there arises a gap between the folded and housed airbag and at least one of the guide walls. This construction prevents the airbag from tearing at the location of the guide bracket even without a gas-leakage preventing means such as reinforcing patch. As a result, the airbag is capable of inflating rapidly at the location of the guide bracket. Moreover, the dimension in the guide bracket is set such that the deployment direction of the airbag is controlled by the two guide walls toward vehicle's inner side. Accordingly, guided by the guide bracket, the inflating airbag smoothly protrudes toward vehicle's inner side without unduly bumping against or hitching on the upper end of the pillar garnish or the airbag cover located above the pillar garnish. Consequently, the airbag swiftly deploys to cover the inner side of windows adjacent the pillar portion.

Therefore, in the head-protecting airbag apparatus of the present invention, the airbag housed in the upper periphery of windows smoothly protrudes inward of vehicle without providing any gas leakage preventing means, such as reinforcing patch, in a region of the airbag where the guide bracket is located and its vicinity.

It is desired that the clearance between the two guide walls of the guide bracket gradually enlarges as it heads for vehicle's inner side from the part of the joint wall. With this construction, even if the airbag increases its thickness when protruding inward, it is not held by the two guide walls. Moreover, the guide walls apply inward reaction force to the airbag, so that the airbag protrudes inward even more smoothly in such a manner as to be pushed out by the guide walls.

The airbag may be constructed such that: the airbag includes: a gas admissive portion inflatable with inflation gas to separate a vehicle's inner wall and vehicle's outer wall each thereof; and a gas feed passage, as part of the gas admissive portion, which is disposed along the upper edge of the airbag as completely deployed, as upstream part of inflation gas flown into the gas admissive portion, and supplies the inflation gas in front and rear directions, and that the dimension of the clearance between the two guide walls of the guide bracket is set such that inner surfaces of the two guide walls and the joint wall contact the outer surface of the gas feed passage in the initial stage of airbag inflation.

With this construction, it is the gas feed passage that inflates initially in the air bag. The gas feed passage inflates within the U-shaped guide bracket without leaving no extra gap therein in the initial stage of airbag inflation. Then the airbag is subjected to reaction force from the joint wall and is guided by the two guide walls, and accordingly, protrudes toward vehicle's inner side further smoothly and swiftly. Moreover, the guide bracket controls the deployment direction of the airbag in the initial stage of inflation toward vehicle's inner side with the airbag contacting all the inner surfaces of the two guide walls and the joint wall, but without causing tear in the airbag. Accordingly, the guide bracket is formed compact.

If the airbag includes a protective portion for covering vehicle's inner side of the windows, as part of the gas admissive portion, below the gas feed passage, the housing of the airbag in the guide bracket is desirably conducted as follows: the gas feed passage is bellows-folded on folds extending in front-rear direction from the state where the vehicle's inner and outer walls of the airbag are overlaid one on the other, thereby provides a bellows-folded portion; the protective portion is roll-folded toward the vehicle's outer wall from the lower edge thereof; and the airbag is housed in the guide bracket in such a manner that the bellows-folded portion is located proximate to an intersection of the guide wall located in upper side and the upper end of the joint wall while locating the roll-folded portion apart from the intersection, such that the roll-folded portion is pushed out of the guide bracket when the bellows-folded portion in the gas feed passage unfolds.

With this construction, since the gas feed passage in the upstream part of inflation gas is bellows-folded, which unfolds easily, the bellows-folded portion swiftly unfolds when fed with inflation gas. Moreover, supported by the joint wall, the bellows-folded portion pushes out the protective portion inward of vehicle along the guide wall located in lower side. Since the protective portion is roll-folded toward the vehicle's outer wall of the airbag from its lower edge, the protective portion or the roll-folded portion unfolds along an occupant and inflates smoothly even if it contacts with the occupant halfway. Consequently, the airbag deploys in a space between occupant's head and the pillar garnish smoothly and swiftly to cover the inner side of the pillar garnish, even if the space is narrow, for example.

In this case, it is desired that the airbag is housed in the guide bracket in such a manner that the airbag is placed on a top surface of the guide wall located in lower side and proximate to an intersection of the lower guide wall and the joint wall. With this construction, when mounting on the vehicle, the folded airbag has only to be placed on the top surface of the lower guide wall while being pressed against the joint wall in the guide bracket. Consequently, the airbag is housed in the guide bracket in a stable manner.

It will also be appreciated that the guide bracket includes, in the front and rear thereof, extended portions where only the joint wall and the lower guide wall extend in the front and rear directions, and that each of the extended portions includes a mounting piece in the upper edge of the joint wall which mounting piece is to be secured to the vehicle body. This construction provides the guide bracket with a configuration where the extended portions to be secured to the vehicle body are located in front and rear of the region having U-shaped cross-section. Therefore, the guide bracket serves to guide the inflating airbag toward vehicle's inner side in a stable manner with the portion having U-shaped section, while being stably fixed to the vehicle.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
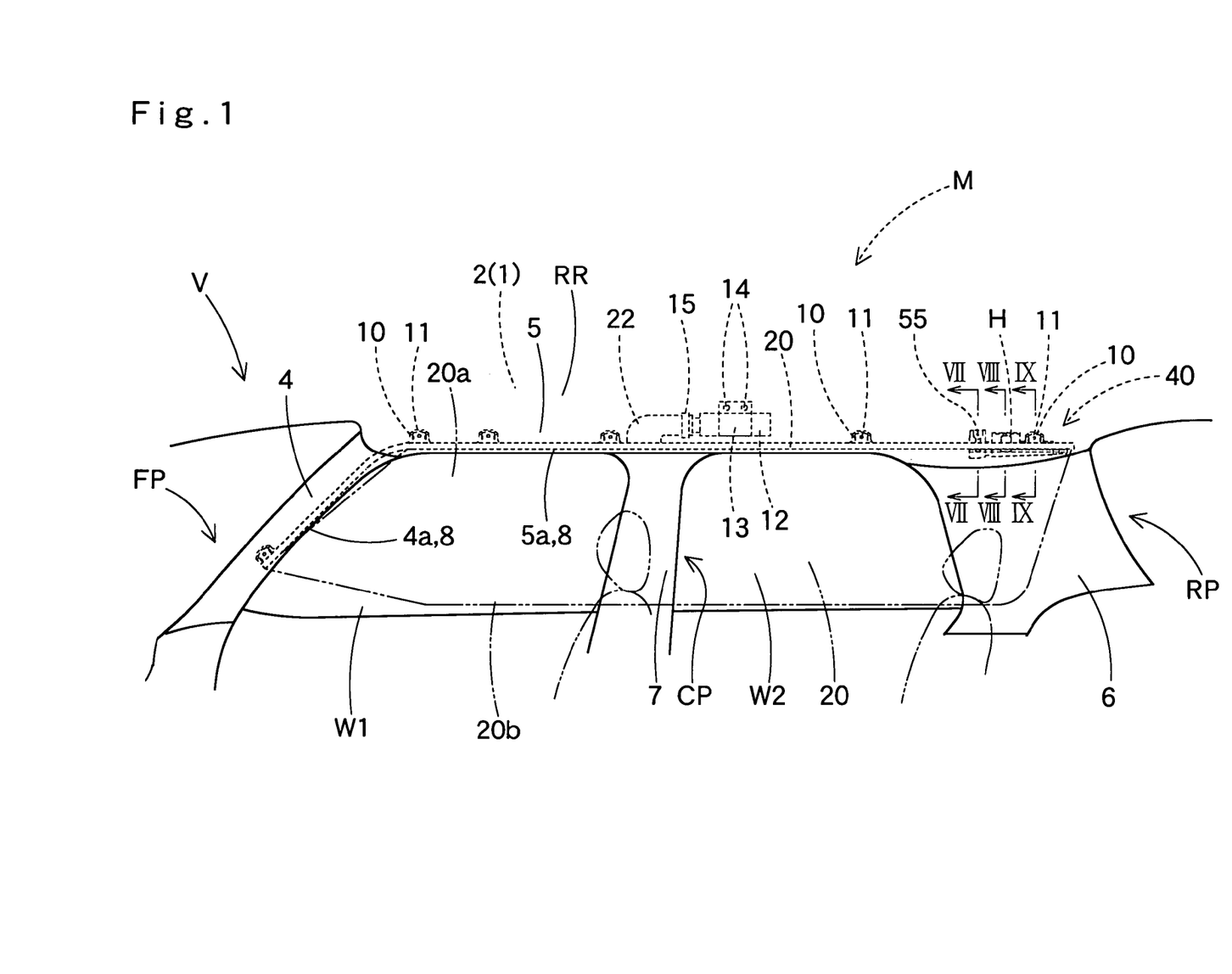
FIG. 1 is a schematic front view of a head-protecting airbag apparatus according to an embodiment of the present invention, as mounted on a vehicle.

As shown in FIG. 1, the head-protecting airbag apparatus M embodying the present invention includes an airbag 20, an inflator 12, mounting brackets 10 and 13, a guide bracket 40, and an airbag cover 8. The airbag 20 is folded and housed along upper periphery of side windows W1 and W2 inside the vehicle V, in a range from lower edge part of the front pillar FP to upper side of the rear pillar RP, via lower edge of the roof side rail RR.

As shown in FIG. 1, the inflator 12 has a substantially cylindrical shape. The inflator 12 is sheathed with a joint port 22 of the airbag 20 for introducing inflation gas, and connected with the airbag 20 by a clamp 15. The inflator 12 is secured to the inner panel 2 in the roof side rail RR by a mounting bracket 13 above the center pillar CP while being covered by the lower edge portion 5a of the roof head lining 5. The inner panel 2 is part of the vehicle body 1. The mounting bracket 13 is made of sheet metal, and is secured to the inner panel 2 by bolts 14 while holding the inflator 12.

Figure 9:
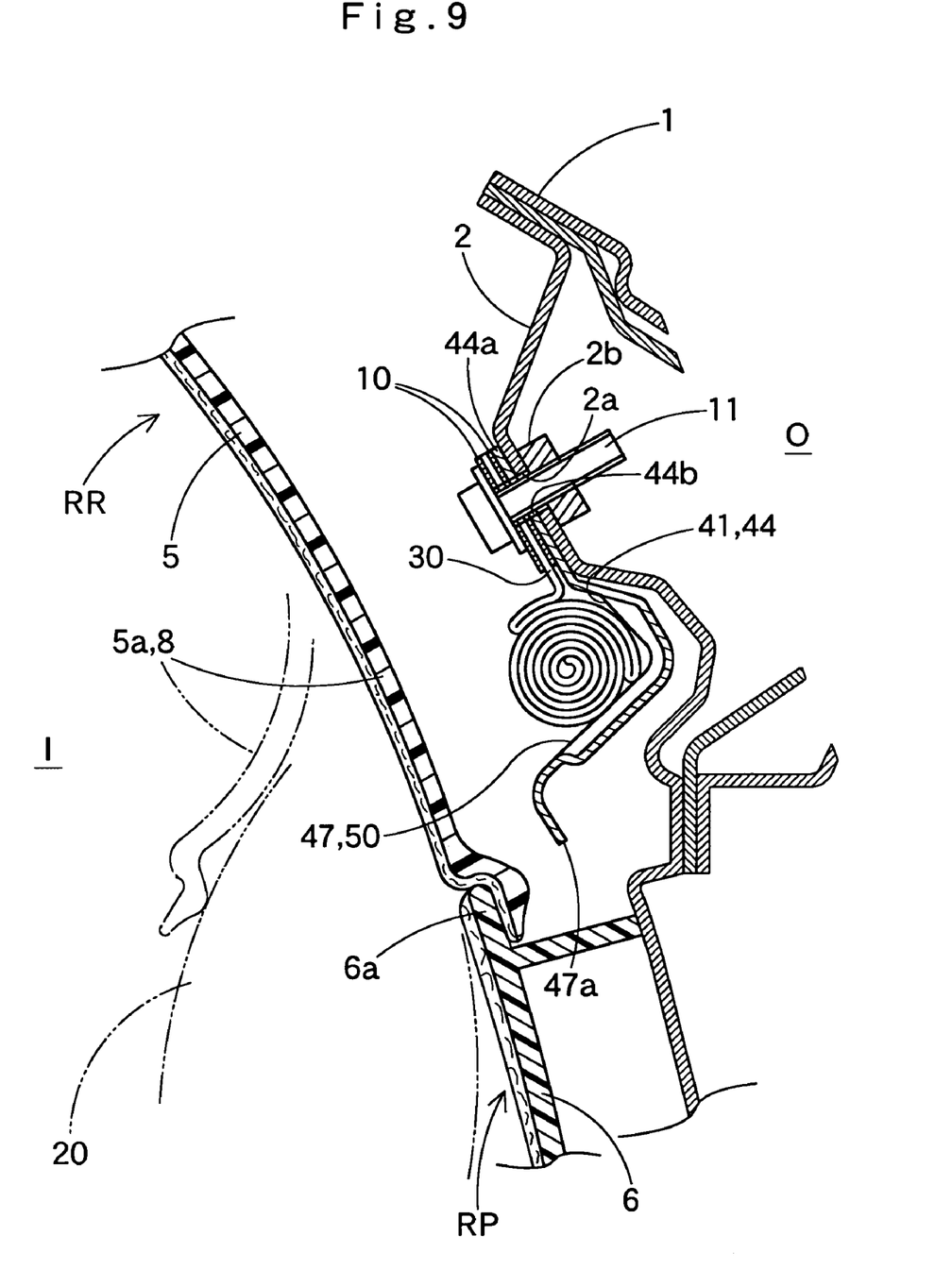
FIG. 9 is a sectional view of the airbag apparatus of FIG. 1 as mounted on the vehicle, taken along line IX-IX of FIG. 1.

As shown in FIG. 9, each of the mounting brackets 10 consists of two plates of sheet metal. These plates are attached to a mounting portion 30 of the airbag 20 from opposite sides. The mounting bracket 10 is secured to the inner panel 2 by a mounting bolt 11, such that the mounting portion 30 is secured to the inner panel 2. The mounting bolt 11 is fastened into a nut 2b at a mounting hole 2a in the inner panel 2.

The airbag cover 8 is composed of the lower edge portion 4a of the pillar garnish 4 arranged in the front pillar FP and the lower edge portion 5a of the roof head lining 5 arranged in the roof side rail RR. The front pillar garnish 4 and the roof head lining 5 are made from synthetic resin, and are attached to the vehicle's interior side of the inner panel 2 in the front pillar FP and the roof side rail RR. The roof head lining 5 is arranged from upper part of the front pillar FP through upper part of the rear pillar RP, via upper part of the center pillar CP.

Referring to FIGS. 1 to 4, the airbag 20 is manufactured by hollow-weaving method of polyamide yarn or the like. When fed with inflation gas G from the inflator 12, the airbag 20 is developed from folded state and deploys to cover vehicle's interior side of side windows W1, W2 and pillar garnishes 7 and 6 at the center pillar CP and the rear pillar RP. The airbag 20 includes a gas admissive portion 21 which admits inflation gas G inside to separate its vehicle's inner wall 21a and vehicle's outer wall 21b, and a non-admissive portion 28 which admits no inflation gas G.

The non-admissive portion 28 is formed by joining the walls 21a and 21b of the admissive portion 21, and includes a peripheral portion 29, mounting portions 30, partitioning portions 31 and 32, and a panel portion 33. The peripheral portion 29 is located in outer edge section of the airbag 20 and encircles the gas admissive portion 21.

Figure 2:
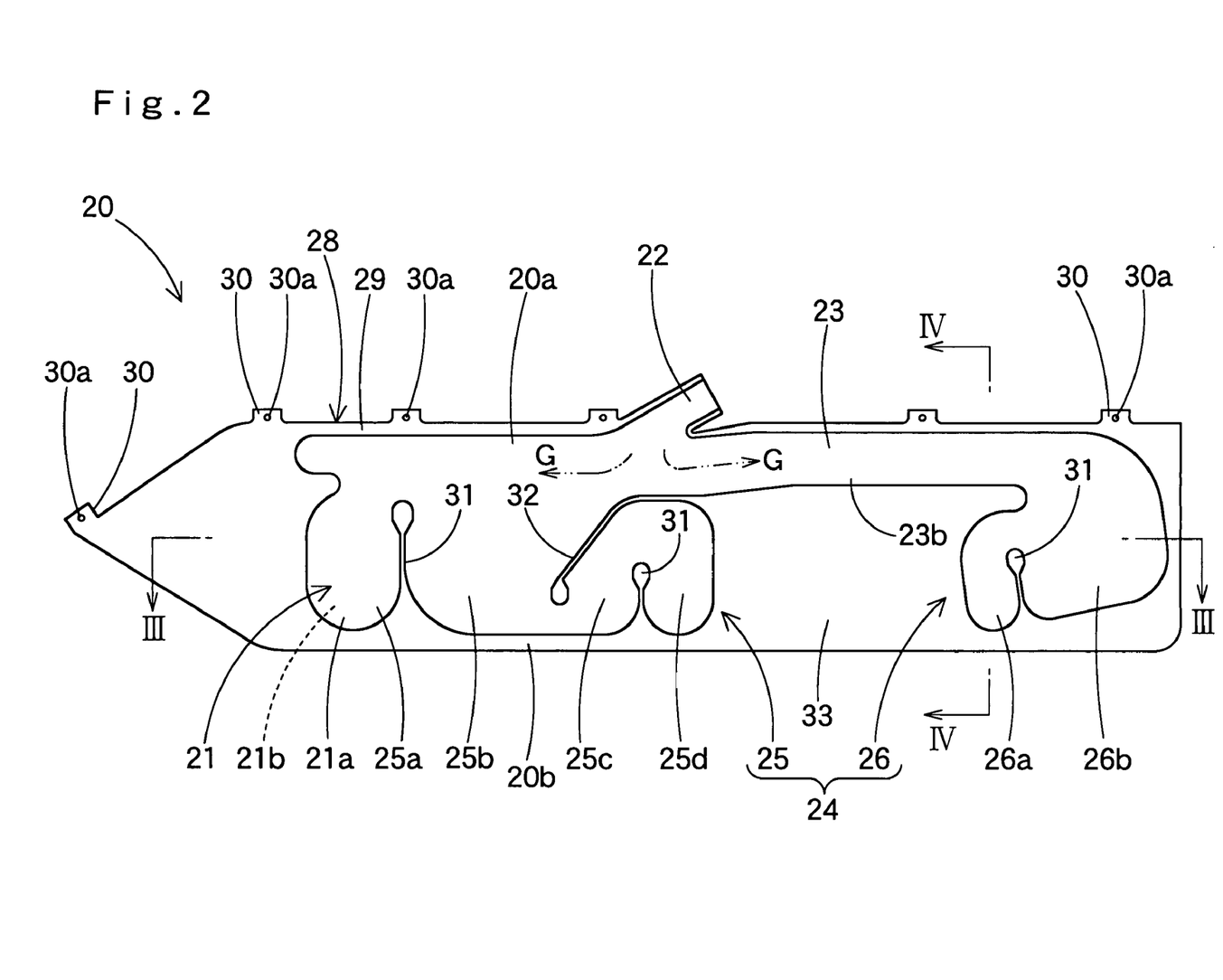
FIG. 2 is a front view of an airbag used in the airbag apparatus of FIG. 1.
Figure 3:
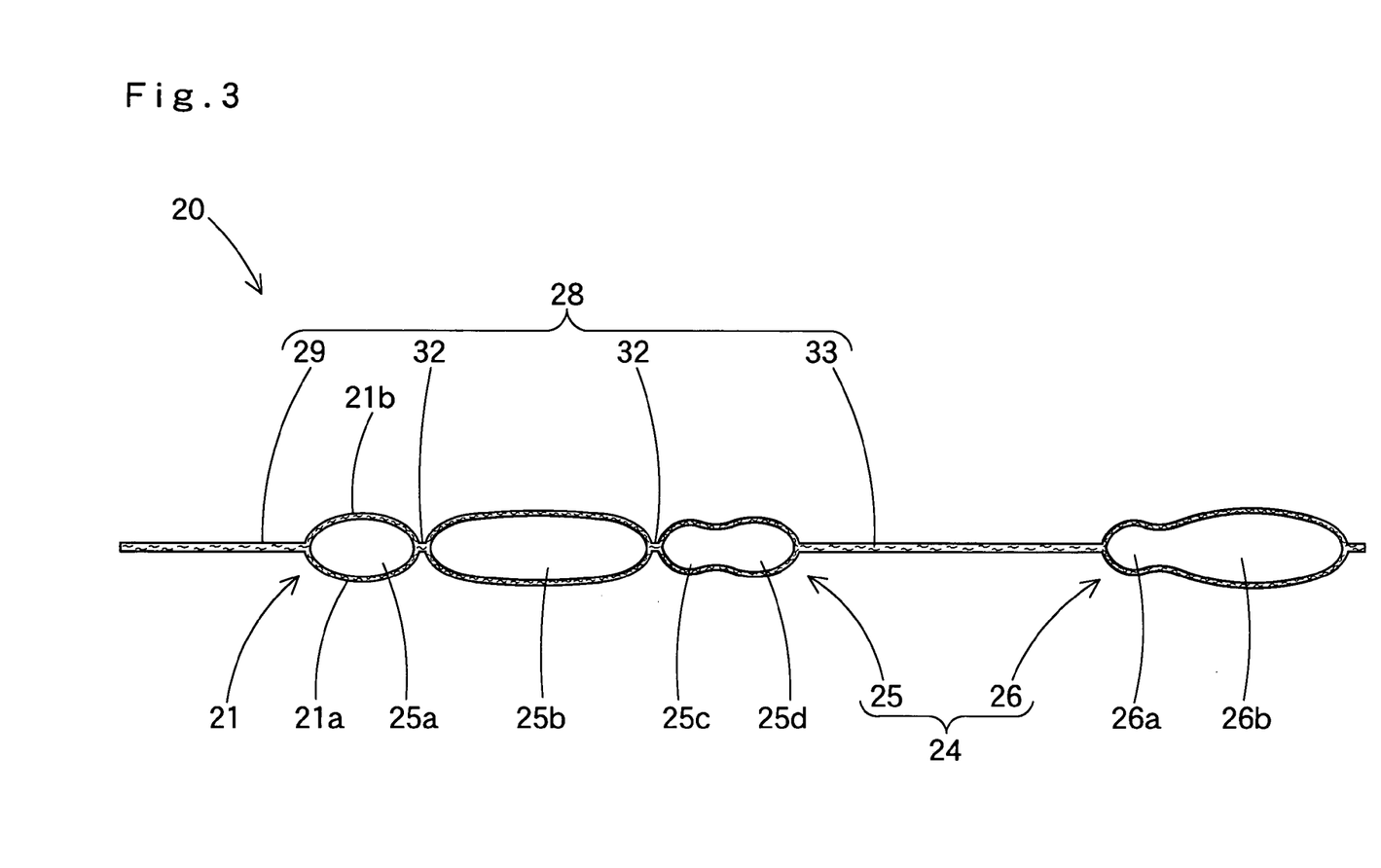
FIG. 3 is an end view of the airbag of FIG. 2 as inflated, taken along line III-III in FIG. 2.
Figure 4:
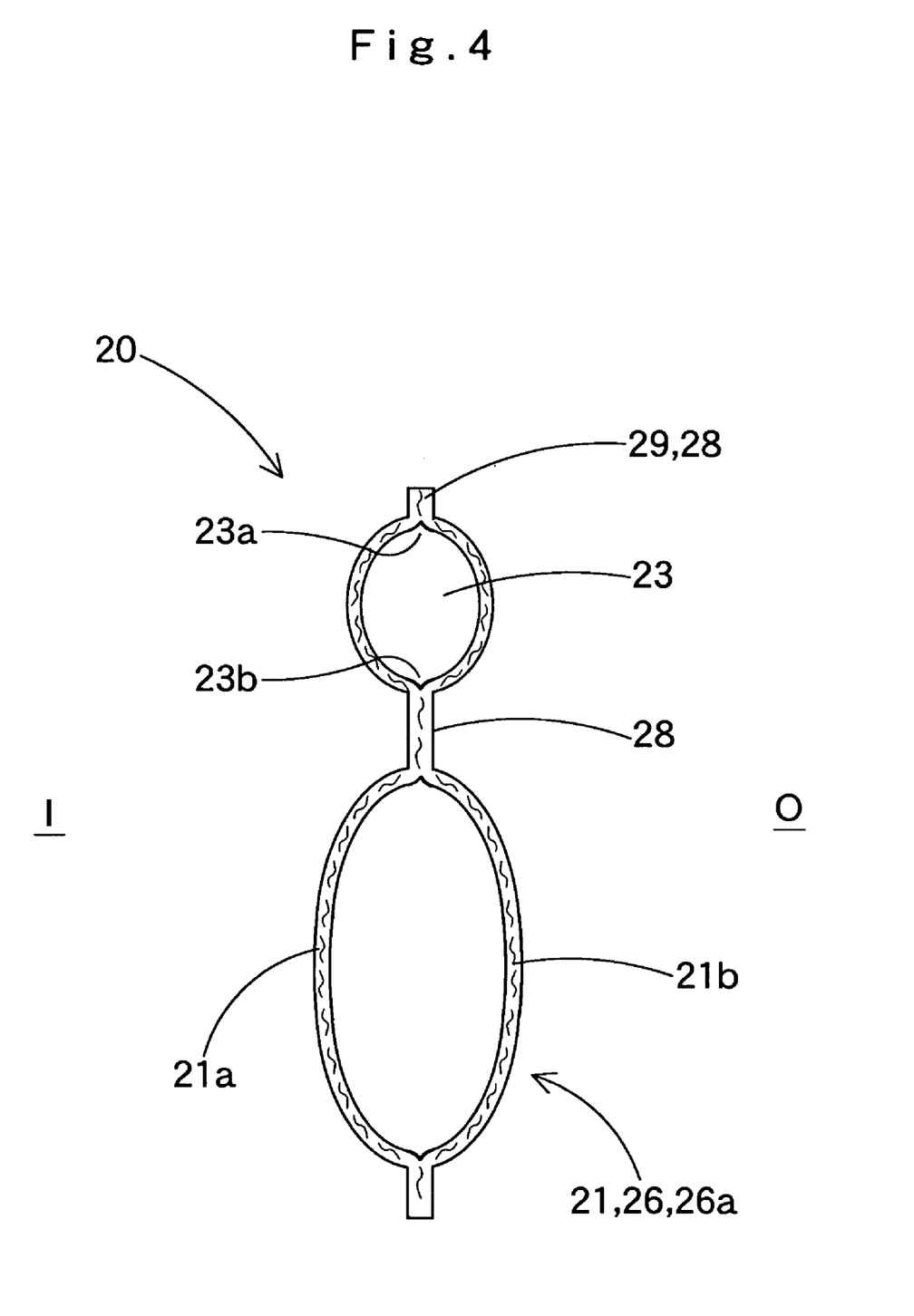
FIG. 4 is an end view of the airbag of FIG. 2 as inflated, taken along line IV-IV in FIG. 2.

Each of the mounting portions 30 projects upward from the peripheral portion 29 in the upper edge section 20a of the airbag 20. In the illustrated embodiment, the airbag 20 includes six mounting portions 30. As best shown in FIG. 2, each of the mounting portions 30 is provided with a mounting hole 30a to insert a bolt 11 therethrough. As aforedescribed, the mounting bracket 10 is applied to each of the mounting portions 30 for attachment to the inner panel 2, and the mounting bolt 11 inserted through the mounting hole 30a is fastened into nut 2b, thereby the mounting portion 30 is secured to the inner panel 2 (refer to FIG. 9).

The panel portion 33 has a rectangular plate shape, and is located between later-described front and rear protective portions 25 and 26 below later-described gas feed passage 23. The panel portion 33 serves to define an entire shape of the airbag 20, and also to reduce the volume of the gas admissive portion 21 so that the time to complete inflation of the airbag 20 is reduced.

The partitioning portions 31 and 32 are located inside front and rear protective portions 25 and 26. The partitioning portions 31 are formed in such a manner as to enter into the protective portion 25 or 26 from the lower edge of the peripheral portion 29. The partitioning portion 32 extends forward and downward from the upper front end of the panel portion 33. The partitioning portions 31 and 32 serve to regulate thickness of the protective portions 25 and 26 as inflated. More specifically, each of the partitioning portions 31 and 32 partitions the front and rear protective portions 25 and 26 as inflated, respectively, into cells 25a, 25b, 25c, 25d and 26a and 26b, such that the protective portions 25 and 26 are inflated flatly, not spherically.

When inflated, the cells 25a, 25b, 25c, 25d, 26a and 26b partitioned by the partitioning portions 31 and 32 serve to reduce the front-rear dimension of the airbag 20, such that a tension in the front-rear direction is exerted in the lower edge 20b of the airbag 20. This tension restrains the completely inflated airbag 20 from moving outward of vehicle when an occupant moving outward of vehicle contacts the airbag 20.

In the specific embodiment, the gas admissive portion 21 includes a joint port 22, a gas feed passage 23 and a protective portion 24. The gas feed passage 23 extends straightly in the front-rear direction of the vehicle V along the upper edge 20a of the airbag 20. In a generally longitudinal center of the gas feed passage 23 is a joint port 22 extending upward for introducing inflation gas G from the inflator 12 into the gas admissive portion 21. The gas feed passage 23 supplies inflation gas G from the joint port 22 both frontward and rearward of the vehicle V, i.e., up to the upper part of the cell 25a in the front side, and up to the upper part of the cell 26b in the rear side. The gas feed passage 23 defines the upstream part of inflation gas that inflates firstly in the airbag 20. As indicated by double-dotted lines in FIG. 1C, when completely inflated after being mounted on the vehicle, the upper part 23a of the gas feed passage (or upstream part) 23 is covered by the airbag cover 8 while the lower part 23b deploys up to the side of the upper part of an occupant's head.

The protective portion 24 serves to protect the occupant's head seated in the vehicle V together with the lower part 23b of the gas feed passage 23. The protective portion 24 includes a front protective portion 25 and a rear protective portion 26. The front protective portion 25 and the rear protective portion 26 are partitioned in the front-rear direction by the panel portion 33. The front protective portion 25 is arranged below the front part of the gas feed passage 23, and is located at the side of front seat of the vehicle V to cover the side window W1 located at the side of front seat upon deployment of the airbag 20. The rear protective portion 26 is arranged below the rear part of the gas feed passage 23, and is located at the side of rear seat of the vehicle V to cover the side window W2 located at the side of rear seat upon airbag deployment. As aforedescribed, the protective portions 25 and 26 provide cells 25a, 25b, 25c, 25d, 26a and 26b lined up in the front-rear direction of the vehicle upon airbag inflation.

Figure 5A:
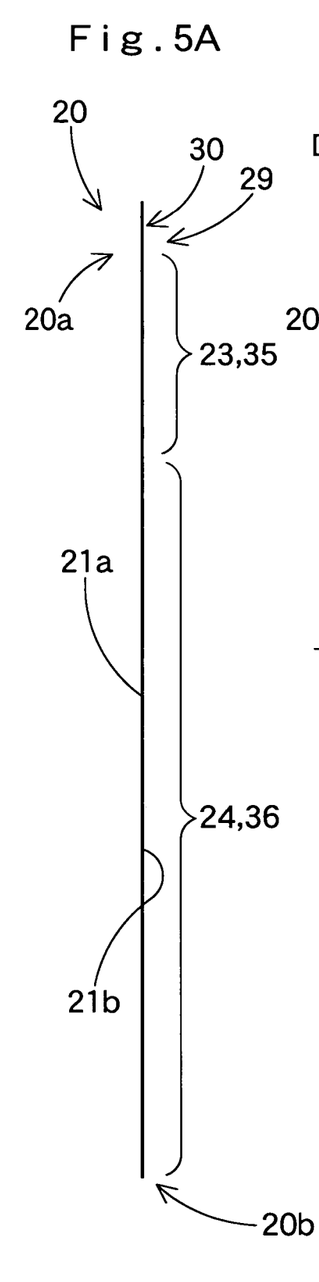
FIGS. 5A, 5B, and 5C illustrate the folding process of the airbag of FIG. 2 in order.

Folding manner of the airbag 20 is now described. Firstly, the airbag 20 is flatly developed with the vehicle's inner wall 21a and outer wall 21b overlaid one on the other. Then the upstream part (gas feed passage) 23 adjacent the upper edge 20a of the airbag 20 is vertically folded and piled, or bellows-folded on subsequent folds D1 and D2, as shown in FIGS. 5A and 5B, so that a bellows-folded portion 35 is provided along the upper edge 20a.

Figures 5B, 5C:
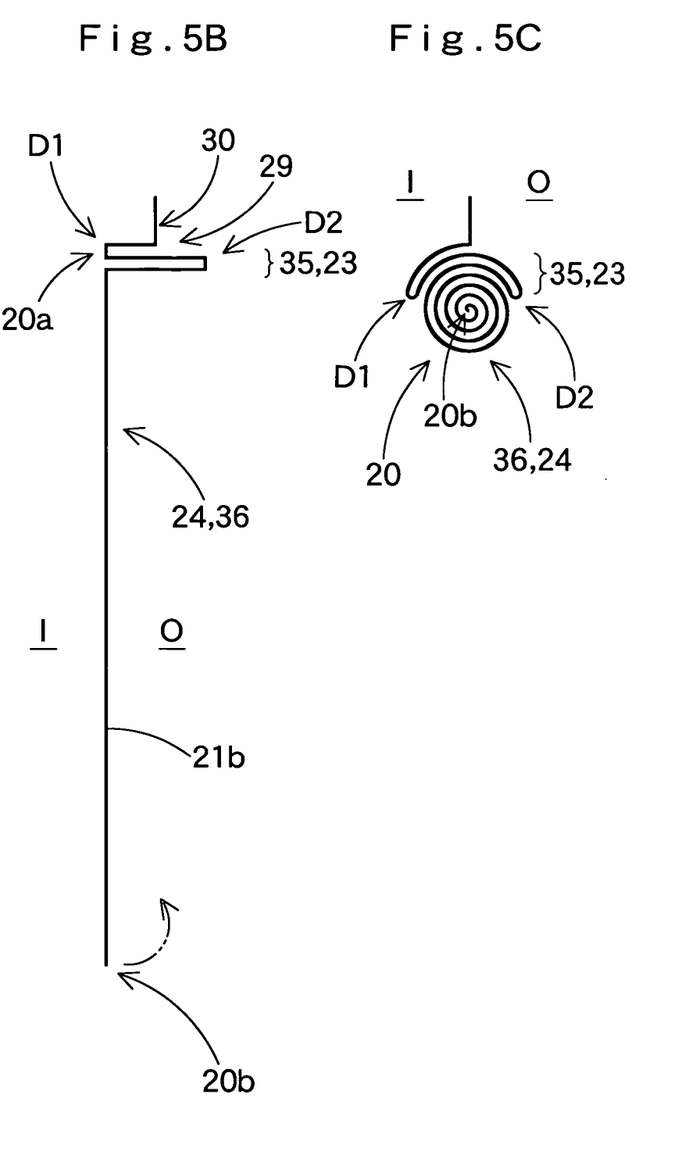

As shown in FIG. 5C, thereafter, the lower part of the airbag 20 below the bellows-folded portion 35 is roll-folded toward exterior O of the vehicle from the lower edge 20b of the airbag 20, so that a roll-folded portion 36 is provided, and folding work of the airbag 20 is completed. A not-shown breakable tape member is wound about the folded-up airbag 20 for keeping the folded-up configuration.

In the embodiment, the guide bracket 40, made of sheet metal, is disposed above the rear pillar RP as shown in FIG. 1, and has a generally U-shaped cross-section, as shown in FIGS. 6 to 9. More specifically, the bracket 40 includes two guide walls 46 and 47 which extend inward of vehicle while confronting each other generally in the vertical direction, and a joint wall 41 joining the guide walls 46 and 47 at the outer ends of the walls 46 and 47. The guide bracket 40 in the embodiment has a generally U-shaped cross-section only in the front vicinity of the longitudinal center portion of the bracket 40. In the remaining region, the upper guide wall 46 is not disposed. That is, in the remaining region other than the region having the U-shaped cross section, only the joint wall 41 and the lower guide wall 47 extend in opposite directions in the front-rear direction.

Figure 7:
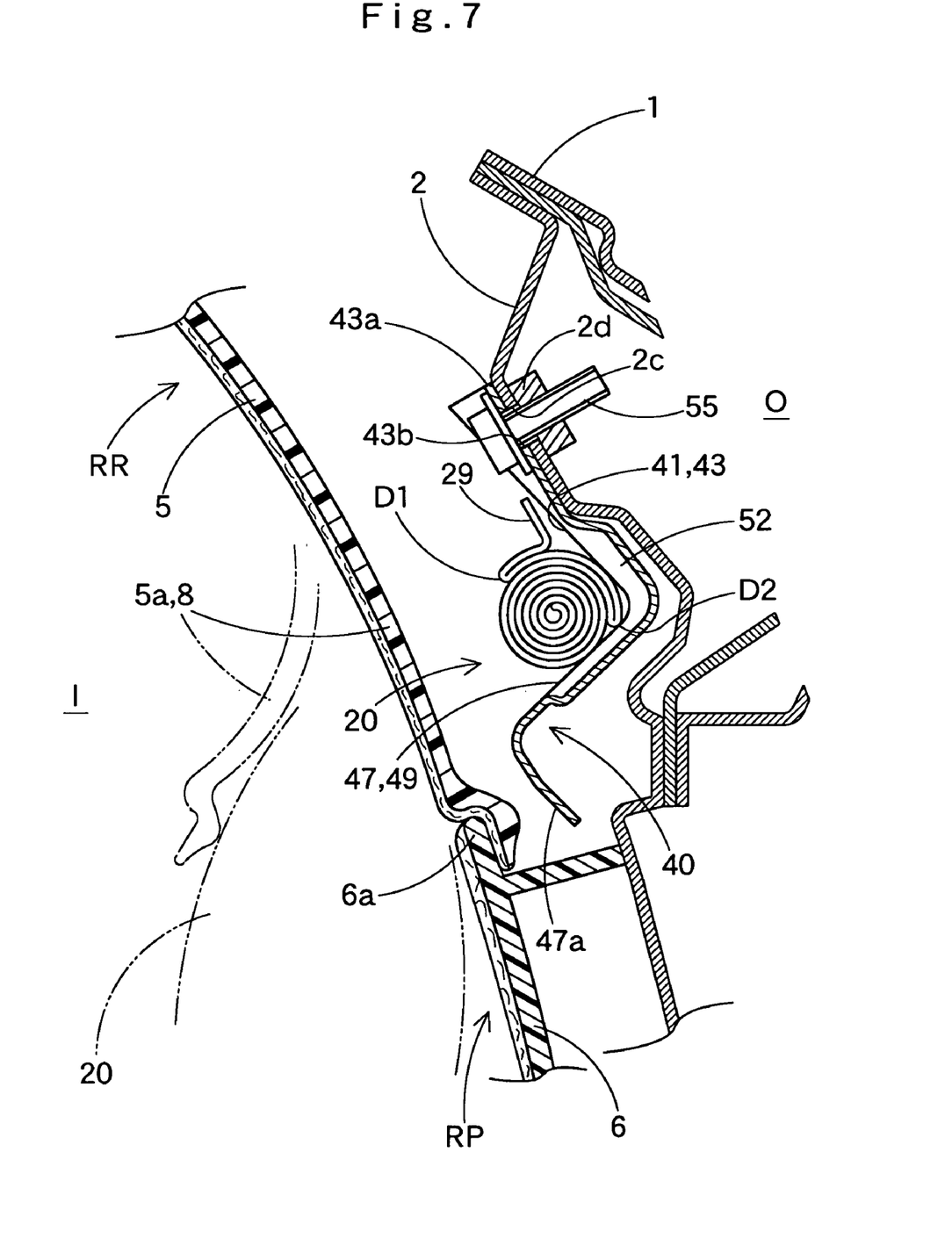
FIG. 7 is a sectional view of the airbag apparatus of FIG. 1 as mounted on the vehicle, taken along line VII-VII of FIG. 1.

The joint wall 41 is disposed generally vertically, and includes a main body 42, a front extended portion 43, and a rear extended portion 44. The main body 42 is positioned in a region of the guide bracket 40 having the U-shaped cross-section. The front extended portion 43 extends forward from the main body 42, whereas the rear extended portion 44 extends rearward from the main body 42. The front and rear extended portions 43 and 44 are shorter than the main body 42 in height, and are provided with mounting pieces 43a and 44a, respectively, each of which extends upward partially from the upper edge of the portions 43/44. The mounting pieces 43a and 44a include mounting holes 43b and 44b, respectively, which run through the pieces 43a and 44b in the in-out direction of vehicle. As shown in FIG. 7, the mounting piece 43a is secured to the inner panel 2 by a mounting bolt 55. The mounting bolt 55 is inserted through the mounting hole 43b, and fastened into a nut 2d attached to a mounting hole 2c of the inner panel 2. As shown in FIG. 9, the mounting piece 44a is secured to the inner panel 2 by a mounting bolt 11, together with the mounting bracket 10 and the mounting portion 30 of the airbag 20. The mounting bolt 11 is inserted through the mounting hole 44b, and fastened into the nut 2d attached to the mounting hole 2c of the inner panel 2.

The lower guide wall 47 lies generally along in-out direction of vehicle, and includes a main body 48, a front extended portion 49, and a rear extended portion 50. The main body 48 is positioned in a region of the guide bracket 40 having the U-shaped cross section. The front extended portion 49 extends forward from the main body 48, whereas the rear extended portion 50 extends rearward from the main body 48. The lower guide wall 47 is provided with a bent portion 47a bent downward from an inner end thereof.

The upper guide wall 46 extends toward vehicle's inner side I from the upper end of the main body 42 of the joint wall 41 in a bent manner.

Figure 6:
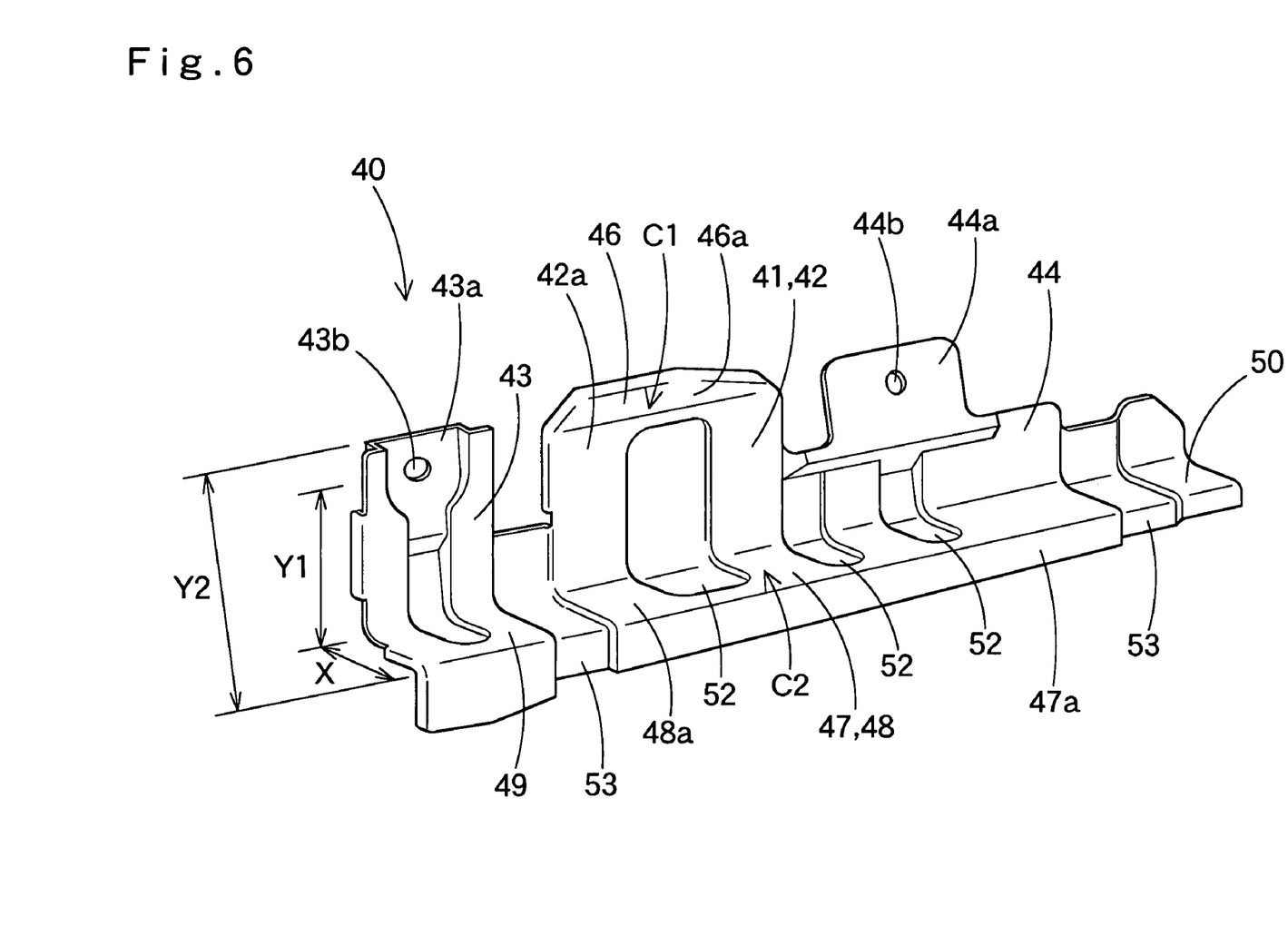
FIG. 6 is a perspective view of a guide bracket used in the airbag apparatus of FIG. 1.

Sections with reference numerals 52 shown in FIG. 6 designate reinforcing recesses which serve to enhance the rigidity of the guide bracket 40, whereas sections with numerals 53 designate positioning recesses for positioning unillustrated tapes used to mount the bracket 40 on the airbag 20. The tapes are wound around the airbag 20 so that the bracket 40 and the airbag 20 be integral, and are breakable. When mounting the bracket 40 on the airbag 20, the airbag 20 is accommodated in the vicinity of an intersection C2 of the lower guide wall 47 and the joint wall 41. At this mounting time, the inflator 12 coupled with the mounting bracket 13 and the mounting brackets 10 are also assembled with the airbag 20, together with the guide bracket 40.

In the guide bracket 40, dimensions Y1 and Y2 of a clearance between the upper guide wall 46 and the main body 48 of the lower guide wall 47 are set as follows in consideration of deployment of the airbag 20 housed between the guide walls 46 and 47. Y1 designates the dimension of the clearance between the upper guide wall 46 and the lower guide wall 47 in part of the joint wall 41, whereas Y2 designates the dimension of the clearance between the guide walls 46 and 47 in part of open end. The dimensions Y1 and Y2 are so set as to leave a gap H between the housed airbag 20 and at least one of the guide walls 46 and 47 (the upper guide wall 46, in this specific embodiment), in such a manner as to allow the airbag to inflate in the gap H in the initial stage of airbag inflation. The dimensions Y1 and Y2 are also set such that the deployment direction of the airbag 20 is controlled by the upper and lower guide walls 46 and 47, i.e., guided toward vehicle's inner side I. Moreover, in the embodiment, the dimensions Y1 and Y2 are set such that the clearance between the guide walls 46 and 47 is gradually enlarged as it heads for vehicle's inner side I from the part of the joint wall 41. Additionally, the dimensions Y1 and Y2 are set such that inner surfaces 46a, 48a and 42a of the guide walls 46, 47 and the joint wall 41 contact the outer surface of the gas feed passage 23 of the inflating airbag 20.

Figure 8:
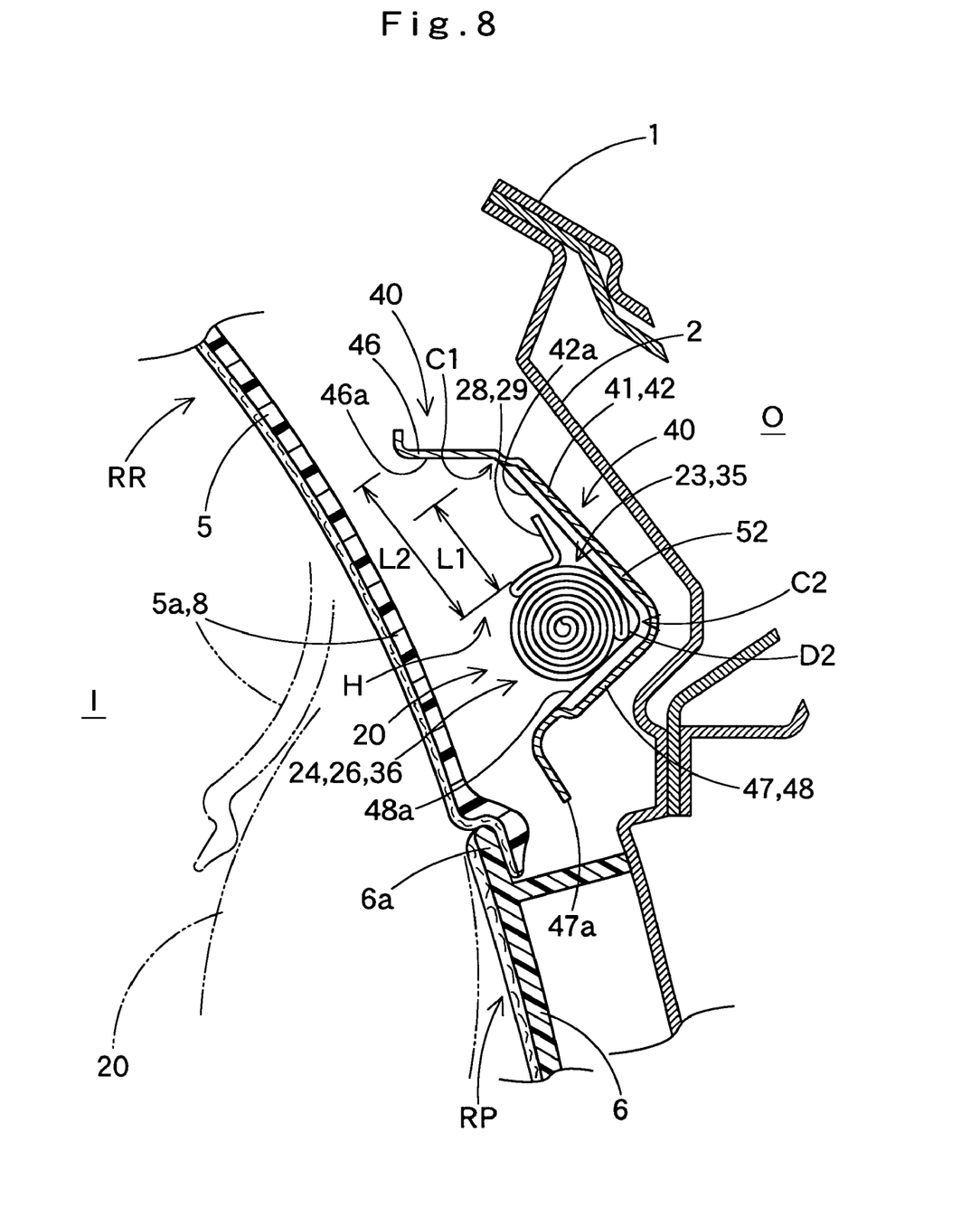
FIG. 8 is a sectional view of the airbag apparatus of FIG. 1 as mounted on the vehicle, taken along line VIII-VIII of FIG. 1.

In the foregoing embodiment, the dimension Y1 is 46 mm, Y2 is 60 mm, the width X of the lower guide wall 47 in the in-out direction of vehicle is 32 mm, the dimension L1 of the gap H between the folded and housed airbag 20 and the guide wall 46 in part of the joint wall 41 is 14 mm, and the dimension L2 of the gap H between the folded and housed airbag 20 and the guide wall 46 in part of the open end is 23 mm (refer to FIGS. 6 and 8).

In the guide bracket 40, when the mounting pieces 43a and 44a are bolt 55 or 11 fixed to vehicle V, the upper guide wall 46 lies along generally horizontal direction, and the top surface 48a of the lower guide wall 47 is oriented obliquely downward as it heads for its leading end (or vehicle's inner side I) from its root part (or the joint wall 41), such that its extension is oriented above the upper end 6a of the pillar garnish 6.

To mount the head-protecting airbag apparatus M of the embodiment on the vehicle V, firstly, the airbag 20 is folded up as described above such that the bellows-folded portion 35 and the roll-folded portion 36 are provided. Then the breakable tape members are wound around the airbag 20 at predetermined positions to keep the folded-up configuration.

Subsequently, the inflator 12 coupled with the mounting bracket 13 is connected to the joint port 22 of the airbag 20 with the clamp 15. Then the mounting brackets 10 are attached to the mounting portions 30 of the airbag 20.

Thereafter, the airbag 20 is disposed on the top surface 48a of the lower guide wall 47 in the guide bracket 40, in such a manner as to locate the bellows-folded portion 35 proximate to an intersection C1 of the upper guide wall 46 and the joint wall 41 while locating the roll-folded portion 36 apart from the intersection C1, and then housed in the vicinity of the intersection C2 of the lower guide wall 47 and the joint wall 41. Then the unillustrated tapes are wrapped at the positioning recesses 53, thereby completing an airbag module.

Thereafter, the mounting brackets 10, 13 and 40 are disposed at predetermined positions of the inner panel 2 as part of vehicle body 1. Then if the brackets 10, 13 and 40 are secured to the inner panel 2 by bolt 11, 14 and 55 fixing through the mounting holes 30a, 43b and 44b, the airbag module is mounted on the vehicle body 1. Subsequently, an unillustrated lead wire extending from a predetermined control for actuating the inflator is connected to the inflator 12. If the front pillar garnish 4, the roof head lining 5, and then the rear pillar garnish 6 and the center pillar garnish 7 are attached to the vehicle body 1, the airbag apparatus M is mounted on the vehicle V.

When the inflator 12 is actuated after mounting of the airbag device M on the vehicle V, inflation gas G discharged from the inflator 12 flows into the gas feed passage (or the upstream part) 23 of the airbag 20 via the joint port 22, and flows therein in opposite directions in the front-rear direction, as indicated by double-dotted lines in FIG. 2. Then the gas G enters each of the front and rear protective portions 25 and 26, and the protective portions 25 and 26 start to unfold and inflate. The airbag 20 then breaks the tape member wound therearound, pushes and opens the airbag cover 8 in the lower edges 4a and 5a of the front pillar garnish 4 and the roof head lining 5, and inflates to cover the inner side I of the side windows W1 and W2, the center pillar CP, and the rear pillar RP while protruding downward, as indicated by double-dotted lines in FIG. 1.

At this time, in the upper side of the rear pillar RP, the airbag 20 protrudes inward I of vehicle from an opening 40a provided between the two guide walls 46 and 47 of the guide bracket 40.

At this time, the dimensions Y1 and Y2 of the clearance between the two guide walls 46 and 47 are so set as to allow the airbag 20 to inflate in the initial stage of inflation. In other words, the dimensions Y1 and Y2 are set such that there arises a gap H between the folded and housed airbag 20 and at least one of the guide walls 46 and 47. This construction prevents the airbag 20 from tearing at the location of the guide bracket 40 even without any gas-leakage preventing means such as reinforcing patch. As a result, the airbag 20 is capable of inflating rapidly at the location of the guide bracket 40. Moreover, the dimensions Y1 and Y2 in the guide bracket 40 are set such that the deployment direction of the airbag 20 is controlled by the two guide walls 46 and 47 toward vehicle's inner side I. Accordingly, the inflating airbag 20 is smoothly guided along the lower surface 46a of the upper guide wall 46 and the top surface 48a of the lower guide wall 47, and protrudes toward vehicle's inner side I without unduly bumping against or hitching on the upper end 6a of the pillar garnish 6 or the airbag cover 8 (or the lower edge 5a of the roof head lining 5) located above the rear pillar garnish 6. Consequently, the airbag 20 swiftly deploys to cover the inner side I of the side window W2 adjacent the rear pillar RP.

Therefore, in the head-protecting airbag apparatus M, the airbag 20 housed in the upper periphery of the side windows W1 and W2 smoothly protrudes inward I of vehicle without providing any gas-leakage preventing means, such as reinforcing patch, in a region of the airbag 20 where the guide bracket 40 is located.

In the foregoing embodiment, the two guide walls 46 and 47 of the guide bracket 40 are so constructed that the opening width therebetween is gradually widened as it heads for vehicle's inner side I from the part of the joint wall 41. With this construction, even if the airbag 20 increases its thickness when protruding inward I, it is not held by the two guide walls 46 and 47. Moreover, the guide walls 46 and 47 applies reaction force acting inward I to the airbag 20, so that the airbag 20 protrudes inward I even more smoothly in such a manner as to be pushed out by the guide walls 46 and 47.

In the foregoing embodiment, the airbag 20 includes the gas admissive portion 21 which is inflatable when fed with inflation gas G to separate its vehicle's inner wall 21a and vehicle's outer wall 21b. The airbag 20 is also provided, in its upper edge part as completely inflated, with the gas feed passage 23 that introduces inflation gas G to front and rear directions. The gas feed passage 23 is the upstream part of inflation gas G flowing into the gas admissive portion 21. The dimensions Y1 and Y2 of the clearance between the guide walls 46 and 47 in the guide bracket 40 are set such that inner surfaces 46a, 48a and 42a of the guide walls 46, 47 and the joint wall 41 contact the outer surface of the gas feed passage 23 of the inflating airbag 20.

Figure 10A:
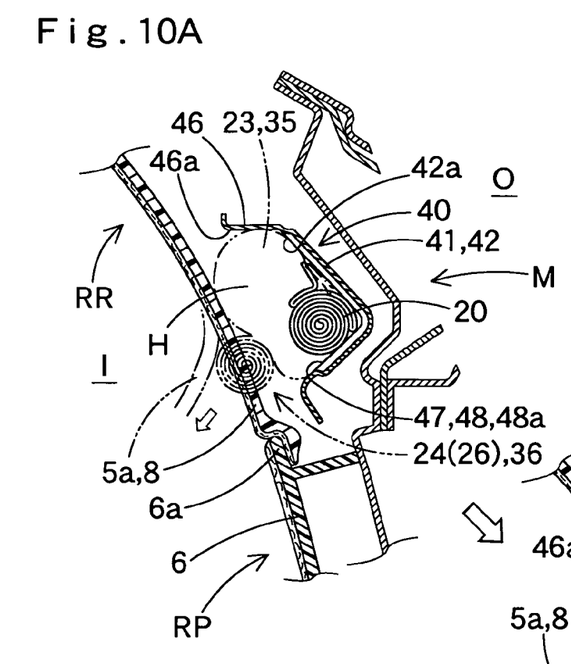
FIGS. 10A, 10B and 10C illustrate the airbag apparatus of FIG. 1 in service in order, by schematic sectional views.
Figure 10B:
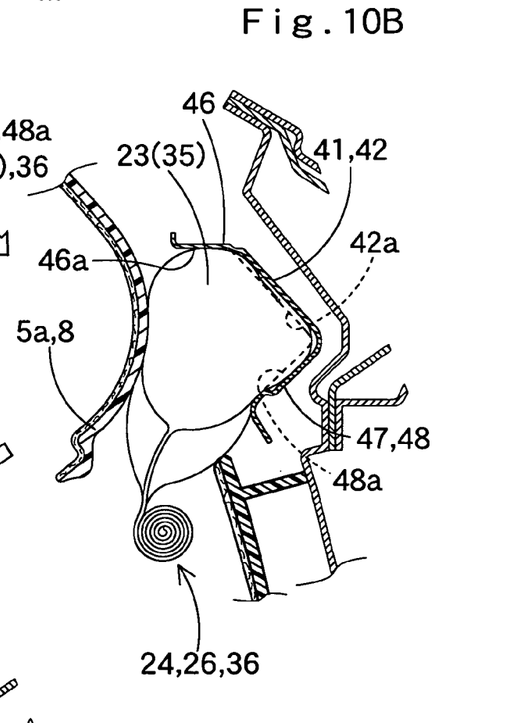
Figure 10C:
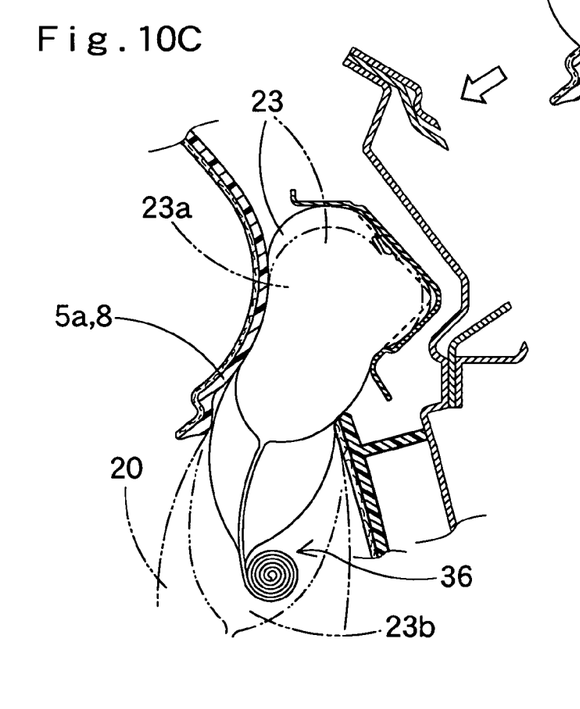

With this construction, it is the gas feed passage 23 that inflates initially in the airbag 20. As shown in FIGS. 10A, 10B and 10C, the gas feed passage 23 inflates within the U-shaped guide bracket 40 while leaving no extra gap therein in the initial stage of inflation of the airbag 20. Then the airbag 20 is subjected to reaction force from the joint wall 41 and is guided by the guide walls 46 and 47, and accordingly, protrudes toward vehicle's inner side I further smoothly and swiftly. Moreover, the guide bracket 40 controls the deployment direction of the airbag 20 in the initial stage of inflation toward vehicle's inner side I with the airbag 20 contacting all the inner surfaces 46a, 48a and 42a of the guide walls 46, 47 and the joint wall 41, but without causing tear in the airbag 20. Accordingly, the guide bracket 40 is formed compact.

In the foregoing embodiment, moreover, the gas admissive portion 21 of the airbag 20 includes the protective portion 24 for covering the vehicle's inner side I of the side windows W1 and W2, below the gas feed passage 23. The gas feed passage 23 is formed into the bellows-folded portion 35 by being bellows-folded on folds D1 and D2 extending in the front-rear direction from the state where the vehicle's inner and outer walls 21a and 21b are overlaid one on the other. The protective portion 24 is formed into the roll-folded portion 36 by being roll-folded toward the vehicle's outer wall 21b from the lower edge 20b. The airbag 20 is housed in the guide bracket 40 so that the roll-folded portion 36 is pushed out of the guide bracket 40 when the bellow-folded portion 35 in the gas feed passage 23 is unfolded. In other words, the airbag 20 is housed in the guide bracket 40 so that the bellows-folded portion 35 is proximate to the intersection C1 of the upper guide wall 46 and the upper end of the joint wall 41, whereas the roll-folded portion 36 is apart therefrom.

With this construction, since the gas feed passage 23 as upstream part of the gas G is folded in a bellows fashion, which bellows unfolds easily. Accordingly, the gas feed passage 23 or the bellows-folded portion 35 swiftly unfolds when fed with inflation gas G, as shown in FIG. 10A. Moreover, supported by the joint wall 41, the bellows-folded portion 35 pushes out the protective portion 24 inward I of vehicle along the top surface 48a of the guide wall 47. Since the protective portion 24 is roll-folded from its lower edge 20b, the portion 24 or the roll-folded portion 36 unfolds along an occupant and inflates smoothly even if it contacts with the occupant halfway. Consequently, the rear protective portion 26 of the airbag 20 deploys in a space between occupant's head and the pillar garnish 6 smoothly and swiftly to cover the inner side I of the pillar garnish 6, even if the space is narrow, for example.

Without considering the above point, however, the protective portion 24 located below the bellows-folded portion 35 may be folded in other folding manner other than roll-folding.

Although the foregoing embodiment has only been described as applied to the guide bracket 40 disposed in the upper side of the rear pillar RP, the guide bracket 40 may be disposed in the upper side of other pillars such as the center pillar CP.

In the foregoing embodiment, the folded airbag 20 is housed in the guide bracket 40 to provide a gap H between the airbag 20 and the upper guide wall 46. However, the guide bracket 40 may be constructed to provide a gap between the housed airbag 20 and the lower guide wall 47, or to provide gaps both above and below the housed airbag 20.

However, if the construction is made to form the gap H between the airbag 20 and the upper guide wall 46, the airbag 20 is housed in the guide bracket 40 on the top surface 48a of the lower guide wall 47 and proximate to the intersection C2 of the lower guide wall 47 and the lower end of the joint wall 41. That is, when mounting on the vehicle V, the folded airbag 20 has only to be placed on the top surface 48a of the lower guide wall 47 while being pressed against the joint wall 41 in the guide bracket 40. Consequently, the airbag 20 is housed in the guide bracket 40 in a stable manner.

In the foregoing embodiment, moreover, the guide bracket 40 includes the extended portions 43, 44, 49 and 50 in front and rear ends thereof, where only the joint wall 41 and the lower side wall 47 are extended in front or rear directions. Each of the front and rear extended portions 43 and 44 is provided in the upper edge of the joint wall 41 with the mounting piece 43a/44a to be secured to the inner panel 2 as part of the vehicle body 1. This construction provides the guide bracket 40 with a configuration where the extended portions 43 and 44, which are to be secured to the vehicle body 1, are located in front and rear of the region having U-shaped cross-section, i.e., the position of the main bodies 42 and 48, which region is constructed of the upper and lower guide walls 46, 47 and the joint wall 41. Therefore, the guide bracket 40 serves to guide the inflating airbag 20 toward vehicle's inner side I in a stable manner with the portion having U-shaped cross section, while being stably fixed to the vehicle V.

What is claimed is:

1. A head-protecting airbag apparatus mounted inside a vehicle in the upper periphery of windows inclusive of an upper part of a pillar covered by pillar garnish at an interior of the vehicle, the airbag apparatus comprising:
    an airbag folded and housed in the upper periphery of the windows inclusive of the upper part of the pillar, the airbag deploying downward from the upper periphery of the windows to cover the inner side of the pillar and windows when fed with inflation gas, wherein the airbag includes:
    a gas admissive portion inflatable with inflation gas to separate an inner wall and an outer wall of the airbag from one another;
    a gas feed passage, as part of the gas admissive portion, the gas feed passage being disposed along the upper edge of the airbag when the airbag is completely deployed, wherein as an upstream part of the inflation gas flows into the gas admissive portion, the gas feed passage supplies inflation gas in front and rear directions;
    a protective portion, which is part of the gas admissive portion, wherein the protective portion is located below the gas feed passage and covers an inner side of the windows when the airbag is deployed, and wherein the protective portion is roll-folded from a lower edge of the protective portion toward the outer wall of the airbag, which faces away from an interior of the vehicle, to provide a roll-folded portion;
    a mounting portion located at an upper edge of a periphery of the gas admissive portion and provided with a mounting hole for receiving a mounting bolt that mounts the airbag on a body of the vehicle;
    an airbag cover for covering the folded and housed airbag, the airbag cover being pushed and opened by the airbag upon airbag inflation; and
    a guide bracket located above the pillar while being covered by the airbag cover for guiding the inflating airbag toward an interior of the vehicle while preventing the airbag from entering an outer side of the pillar garnish, wherein the guide bracket comprises:
    a main body that includes an upper guide wall and a lower guide wall, which confront each other generally in the vertical direction and extend inward of the vehicle, wherein the main body accommodates the folded airbag between the guide walls and allows the airbag to protrude toward the interior of the vehicle from an opening provided between ends of the guide walls;
    a joint wall joining the upper and lower guide walls at the outer ends of the guide walls such that the min body has a generally U-shaped cross section; and
    extended portions located at the front and rear of the main body, each extended portion including only the lower guide wall and the joint wall, wherein
    the airbag is housed in the guide bracket so that the gas feed passage is located proximate to an intersection of the upper guide wall and the joint wall, while the roll-folded portion is located apart from the intersection, wherein the gas feed passage pushes the roll-folded portion out of the guide bracket when the airbag is inflated and the roll-folded portion unfolds;
    at least either one of the extended portions includes at an upper end a mounting piece provided with a mounting hole for receiving the mounting bolt put through the mounting hole of the mounting portion of the airbag wherein the mounting bolt further engages a part of the vehicle body such that the airbag and the guide bracket are mounted on the vehicle body together,
    a dimension of a clearance between the guide walls of the main body is set to provide a gap between the housed airbag and at least one of the guide walls, whereby the airbag is allowed to inflate in the gap in the initial stage of airbag inflation,
    the dimension of the clearance is also set such that the deployment direction of the airbag is controlled by the guide walls, toward the interior of the vehicle,
    the dimension of the clearance between the guide walls of the main body is further set such that inner surfaces of the two guide walls and the joint wall contact the outer surface of the gas feed passage in the initial stage of airbag inflation, and
    the upper guide wall extends toward the interior of the vehicle from an upper end of the joint wall at a position between the front and rear extended portions so as to be located inward relative to the mounting piece.

2. The head-protecting airbag apparatus according to claim 1, wherein the clearance between the two guide walls of the guide bracket gradually enlarges as it heads for vehicle's inner side from the part of the joint wall.

3. The head-protecting airbag apparatus according to claim 1, wherein the gas feed passage is bellows-folded on folds extending in front-rear direction from a state where inner and outer walls of the airbag are overlaid one on the other, to provide a bellows-folded portion.

4. The head-protecting airbag apparatus according to claim 3, wherein the airbag is housed in the guide bracket in such a manner that the airbag is placed on a top surface of the guide wall located in lower side and proximate to an intersection of the lower guide wall and the joint wall.

5. The head-protecting airbag apparatus according to claim 1, wherein the gap is located between the housed airbag and the upper guide wall, and the size of the gap is generally equal to or greater than the height of the airbag when the airbag is folded and housed.

6. The head-protecting airbag apparatus according to claim 1, wherein the dimension of the clearance between the guide walls of the main body is further set such that all the inner surfaces of the two guide walls and the joint wall contact the outer surface of the gas feed passage in the initial stage of airbag inflation.

7. A head-protecting airbag apparatus for installation inside a vehicle in the upper periphery of windows, including a location above a pillar, at an interior of the vehicle, the airbag apparatus comprising:

an airbag folded and adapted to be housed in the upper periphery of the windows, including a location above a pillar, wherein the airbag is constructed to deploy downward from the upper periphery of the windows, when the airbag apparatus is installed in the vehicle, to cover the inner side of the pillar and windows when fed with inflation gas, wherein the airbag includes:

a gas admissive portion inflatable with inflation gas to separate an inner wall and an outer wall of the airbag from one another;

a gas feed passage, as part of the gas admissive portion, the gas feed passage being disposed along the upper edge of the airbag when the airbag is completely deployed, wherein as an upstream part of the inflation gas flows into the gas admissive portion, the gas feed passage supplies inflation gas in front and rear directions;

a protective portion, which is part of the gas admissive portion, wherein the protective portion is located below the gas feed passage and covers an inner side of the windows when the airbag is deployed and wherein the protective portion is roll-folded from a lower edge of the protective portion toward the outer wall of the airbag, which faces away from an interior of the vehicle when the airbag apparatus is installed in the vehicle, to provide a roll-folded portion;

a mounting portion located at an upper edge of a periphery of the gas admissive portion and provided with a mounting hole for receiving a mounting bolt for mounting the airbag on a body of the vehicle; and a guide bracket, which is formed to be located above the pillar when the airbag apparatus is installed in the vehicle, for guiding the inflating airbag toward an interior of the vehicle while preventing the airbag from entering an outer side of a pillar garnish of the vehicle, wherein the guide bracket comprises:

a main body that includes an upper guide wall and a lower guide wall, which confront each other and extend inward of the vehicle when the airbag apparatus is installed in the vehicle, wherein the main body accommodates the folded airbag between the guide walls and allows the airbag to protrude toward the interior of the vehicle from an opening provided between ends of the guide walls;

a joint wall joining the upper and lower guide walls at the outer ends of the guide walls such that the min body has a generally U-shaped cross section; and extended portions located at the front and rear of the main body, each extended portion including only the lower guide wall and the joint wall, wherein the airbag is housed in the guide bracket so that the gas feed passage is located proximate to an intersection of the upper guide wall and the joint wall, while the roll-folded portion is located apart from the intersection, wherein the gas feed passage pushes the roll-folded portion out of the guide bracket when the airbag is inflated and the roll-folded portion unfolds;

the airbag is housed in the guide bracket in such a manner that the airbag is placed on a top surface of the guide wall, which is located in lower side of the airbag apparatus, and proximate to an intersection of the lower guide wall and the joint wall;

at least either one of the extended portions includes at an upper end a mounting piece provided with a mounting hole for receiving the mounting bolt put through the mounting hole of the mounting portion of the airbag, so that the airbag apparatus is adapted to be fixed to the body of the vehicle by the mounting bolt, a dimension of a clearance between the guide walls of the main body is set to provide a gap between the housed airbag and at least one of the guide walls, whereby the airing is allowed to inflate in the gap in the initial stage of airbag inflation, the dimension of the clearance is also set such that the deployment direction of the airbag is controlled by the guide walls, toward the interior of the vehicle, when the airbag apparatus is installed in the vehicle, the dimension of the clearance between the guide walls of the main body is further set such that inner surfaces of the two guide walls and the joint wall contact the outer surface of the gas feed passage in the initial stage of airbag inflation, and the upper guide wall is arranged to extend toward the interior of the vehicle from an upper end of the joint wall at a position between the front and rear extended portions so as to be located inward relative to the mounting piece, when the airbag apparatus is installed in the vehicle.

8. The head-protecting airbag apparatus according to claim 7, wherein the gap is located between the housed airbag and the upper guide wall, and the size of the gap is generally equal to or greater than the height of the airbag when the airbag is folded and housed.

9. The head-protecting airbag apparatus according to claim 7, wherein the dimension of the clearance between the guide walls of the main body is further set such that all the inner surfaces of the two guide walls and the joint wall contact the outer surface of the gas feed passage in the initial stage of airbag inflation.

* * * * *